United States Patent
Zhang et al.

(10) Patent No.: US 9,525,481 B2
(45) Date of Patent: Dec. 20, 2016

(54) METHOD AND APPARATUS FOR CALCULATING NONLINEAR TRANSMISSION IMPAIRMENT OF OPTICAL FIBER LINK

(71) Applicant: HUAWEI TECHNOLOGIES CO., LTD., Shenzhen, Guandong (CN)

(72) Inventors: Sen Zhang, Shenzhen (CN); Enbo Zhou, Shenzhen (CN); Yabin Ye, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 13 days.

(21) Appl. No.: 14/580,989

(22) Filed: Dec. 23, 2014

(65) Prior Publication Data

US 2015/0117853 A1 Apr. 30, 2015

Related U.S. Application Data

(63) Continuation of application No. PCT/CN2012/077761, filed on Jun. 28, 2012.

(51) Int. Cl.
*H04B 10/08* (2006.01)
*H04B 17/00* (2015.01)
(Continued)

(52) U.S. Cl.
CPC ...... *H04B 10/0791* (2013.01); *H04B 10/0795* (2013.01); *H04B 10/2543* (2013.01);
(Continued)

(58) Field of Classification Search
CPC .............. H04B 10/0791; H04B 10/079; H04B 10/0795; H04B 10/2543; H04B 10/07953; H04B 10/00; H04B 17/00
(Continued)

(56) References Cited

U.S. PATENT DOCUMENTS 6,633,712 B2 * 10/2003 Dennis ............ H04B 10/25253
359/334
7,133,620 B1 11/2006 Ho et al.
(Continued)

FOREIGN PATENT DOCUMENTS

| CN | 101714085 | 5/2010 |
|----|-----------|--------|
| CN | 101848036 | 9/2010 |

(Continued)

OTHER PUBLICATIONS

International Search Report mailed Apr. 4, 2013 in corresponding International Application No. PCT/CN2012/077761.
(Continued)

*Primary Examiner* — Ken N Vanderpuye
*Assistant Examiner* — Abbas H Alagheband
(74) *Attorney, Agent, or Firm* — Staas & Halsey LLP

(57) ABSTRACT

The present invention relates to the field of network communications and discloses a method for calculating a nonlinear transmission impairment, including: determining that no pump channel exists in an optical fiber link, obtaining a factor of intra-band nonlinear noise that does not pass through an optical filter, and obtaining integral power in signal light bandwidth of a span; correcting the factor of intra-band nonlinear noise that does not pass through an optical filter, to obtain a factor of intra-band nonlinear noise of the span that passes through an optical filter; calculating nonlinear noise of the span; and obtaining total nonlinear noise of the optical fiber link according to the nonlinear noise of the span, and obtaining a nonlinear transmission impairment of the optical fiber link. Embodiments of the present invention further provide an apparatus for calculating a nonlinear transmission impairment of an optical fiber link.

12 Claims, 4 Drawing Sheets

(51) Int. Cl.
*H04B 10/079* (2013.01)
*H04B 10/2543* (2013.01)
*H04B 10/00* (2013.01)

(52) U.S. Cl.
CPC ............ *H04B 10/00* (2013.01); *H04B 10/079* (2013.01); *H04B 10/07953* (2013.01); *H04B 17/00* (2013.01)

(58) Field of Classification Search
USPC ................. 398/28, 34, 35, 38, 20, 25, 26
See application file for complete search history.

(56) References Cited

U.S. PATENT DOCUMENTS

| | | | | |
|---|---|---|---|---|
| H002190 H | * | 6/2007 | Chen | H04B 10/073 375/353 |
| 8,909,041 B2 | * | 12/2014 | Ye | H04B 10/07953 398/147 |
| 2002/0044322 A1 | * | 4/2002 | Blumenthal | H04B 10/00 398/147 |
| 2003/0048984 A1 | * | 3/2003 | Ng | H04B 10/25073 385/24 |
| 2004/0125435 A1 | * | 7/2004 | Liu | H04B 10/255 359/337 |
| 2006/0013589 A1 | | 1/2006 | Odate et al. | |
| 2006/0051039 A1 | * | 3/2006 | Wei | H04B 10/2531 385/123 |
| 2006/0127100 A1 | * | 6/2006 | Frankel | H04B 10/29 398/158 |
| 2007/0166052 A1 | * | 7/2007 | Uda | H04J 14/0221 398/177 |
| 2007/0206954 A1 | | 9/2007 | Fishman et al. | |
| 2007/0291349 A1 | * | 12/2007 | Zhou | H01S 3/302 359/333 |
| 2007/0291351 A1 | * | 12/2007 | Zhou | H01S 3/06758 359/334 |
| 2009/0136238 A1 | * | 5/2009 | Gill | H04B 10/85 398/141 |
| 2010/0046942 A1 | * | 2/2010 | Taylor | H04B 10/60 398/26 |
| 2010/0183294 A1 | * | 7/2010 | Villarruel | H04B 10/032 398/10 |
| 2010/0290779 A1 | * | 11/2010 | Zaacks | H04B 10/073 398/25 |
| 2010/0296818 A1 | * | 11/2010 | Zhou | H01S 3/10015 398/147 |
| 2011/0255870 A1 | * | 10/2011 | Grigoryan | H04B 10/548 398/65 |
| 2012/0263481 A1 | * | 10/2012 | Ip | H04B 10/2543 398/193 |
| 2013/0028597 A1 | * | 1/2013 | Ye | H04B 10/07953 398/26 |
| 2013/0070866 A1 | * | 3/2013 | Wu | H04L 27/36 375/260 |

FOREIGN PATENT DOCUMENTS

| | | |
|---|---|---|
| CN | 102075257 | 5/2011 |
| CN | 102420661 | 4/2012 |
| JP | 4861960 | 1/2012 |

OTHER PUBLICATIONS

Search Report mailed Sep. 23, 2014 for corresponding Chinese Patent Application No. 201280000582.2.
Office Action mailed Sep. 30, 2014 for Chinese Patent Application No. 201280000582.2.
PCT Forms PCT/ISA/210 (International Search Report), PCT/ISA/220, and PCT/ISA/237 mailed Apr. 4, 2013 for corresponding International Patent Application No. PCT/CN2012/077761.

* cited by examiner

METHOD AND APPARATUS FOR CALCULATING NONLINEAR TRANSMISSION IMPAIRMENT OF OPTICAL FIBER LINK

CROSS-REFERENCE TO RELATED APPLICATIONS

This application is a continuation of International Application No. PCT/CN2012/077761, filed on Jun. 28, 2012, which is hereby incorporated by reference in its entirety.

TECHNICAL FIELD

The present invention relates to network communications technologies, and in particular, to a method and an apparatus for calculating a nonlinear transmission impairment of an optical fiber link.

BACKGROUND

With the rapid development of optical communications technologies, implementation of the dense wavelength division multiplexing technology (Dense Wavelength Division Multiplexing, DWDM) greatly improves the capacity and transmission distance of an optical fiber communications system, and from a sending end to a receiving end, each wavelength signal needs to pass through filter devices, such as a multiplex, a comb filter, and a demultiplexer. On the other hand, an optical network structure evolves from a ring network to a mesh network, and massive optical filters will be used on a network to process a wavelength service.

With the increase of a signal modulation rate, width of a signal spectrum also becomes broader. On a high-rate system, such as 40 G and 100 G, performance of an optical fiber link is influenced when an optical filter filters a wavelength service, where influences mainly include two aspects: One aspect is as follows: On a system without an optical fiber, an optical signal to noise ratio (Optical Signal to Noise Ratio, OSNR) penalty, called a linear impairment, is generated because an optical filter cuts off a spectrum, and the linear impairment keeps unchanged in a situation that the number of optical filters is fixed and the number of signal spectrums is fixed, so that it is easy to establish a simple look-up table through a laboratory measurement. The other aspect is as follows: On a system with an optical fiber, in a situation that incident optical power is relatively high, an optical filter effect and a nonlinear effect work together and cause a nonlinear impairment to a signal, where an effect of the impairment cannot be ignored, and a size of a caused impairment is different if the number of optical filters is different or a location in which an optical filter is arranged in an optical fiber link is different.

The nonlinear schrodinger equation is a fundamental equation for studying transmission of an optical pulse in an optical fiber, and it is a scalar approximation form of a wave equation that is capable of explaining absorption, dispersion, and nonlinearity. Currently, the most conventional method for calculating a nonlinear transmission impairment of an optical fiber link having an optical filter is: solving the nonlinear schrodinger equation by using a numerical method and performing simulation for transmission of an optical signal in the link, so as to obtain the nonlinear transmission impairment, which is caused by various factors including the optical filter, of the optical fiber link. Currently, there are various methods for solving the nonlinear schrodinger equation for a quick numerical solution, such as the distribution Fourier method.

However, an analytical solution cannot be obtained from the nonlinear schrodinger equation. Therefore, it requires at least several hours to accurately calculate a nonlinear impairment of a long-distance optical fiber link even by using a professional server, and occupation of massive computer resources is required. Such calculating speed cannot be tolerated in a scenario requiring a rapid calculation, such as live network deployment, expansion, and maintenance.

SUMMARY

Embodiments of the present invention provide a method and an apparatus for calculating a nonlinear transmission impairment of an optical fiber link, which solve a problem of a slow calculation speed and occupation of massive calculation resources in the prior art.

The embodiments of the present invention adopt the following technical solutions:

An aspect of the present invention provides a method for calculating a nonlinear transmission impairment of an optical fiber link, including:

determining that no pump channel exists in an optical fiber link, obtaining a factor of intra-band nonlinear noise that is in the optical fiber link and does not pass through an optical filter, and obtaining integral power in signal light bandwidth of a span in the optical fiber link;

correcting the factor of intra-band nonlinear noise that does not pass through an optical filter, to obtain a factor of intra-band nonlinear noise of the span in the optical fiber link that passes through an optical filter;

calculating nonlinear noise of the span in the optical fiber link by using the following formula:

$$P_{NL} = \alpha_{intra}(n) \cdot (P_S)^3;$$

where, $P_{NL}$ represents the nonlinear noise of the span;

$\alpha_{intra}(n)$ represents the factor of intra-band nonlinear noise of the span that passes through an optical filter;

n represents the number of optical filters through which a signal light of the span passes; and $P_S$ represents the integral power in the signal light bandwidth of the span; and obtaining total nonlinear noise of the optical fiber link according to the nonlinear noise of the span in the optical fiber link, and obtaining a nonlinear transmission impairment of the optical fiber link.

Another aspect of the present invention provides a method for calculating a nonlinear transmission impairment of an optical fiber link, including:

determining that one or more pump channels exist in an optical fiber link, obtaining a factor of intra-band nonlinear noise that is in the optical fiber link and does not pass through an optical filter and a factor of inter-band nonlinear noise that is in the optical fiber link and does not pass through an optical filter, and obtaining integral power in signal light bandwidth of a span in the optical fiber link and integral power in pump channel bandwidth of the span in the optical fiber link;

correcting the factor of intra-band nonlinear noise that does not pass through an optical filter and the factor of inter-band nonlinear noise that does not pass through an optical filter, to obtain a factor of intra-band nonlinear noise of the span in the optical fiber link that passes through an optical filter and a factor of inter-band nonlinear noise of the span in the optical fiber link that passes through an optical filter;

calculating nonlinear noise of the span in the optical fiber link by using the following formula:

$$P_{NL}=\alpha_{intra}(n)\cdot(P_S)^3+\Sigma_{j=1}^k\alpha_{inter}(n,m)\cdot P_{S'}(P_{Nj})^2;$$

where, $P_{NL}$ represents the nonlinear noise of the span;

$\alpha_{intra}(n)$ represents the factor of intra-band nonlinear noise of the span that passes through an optical filter;

$\alpha_{inter}(n,m)$ represents the factor of inter-band nonlinear noise of the span that passes through an optical filter;

n represents the number of optical filters through which a signal light of the span passes, and m represents the number of optical filters through which a pump channel of the span passes;

$P_S$ represents the integral power in the signal light bandwidth of the span;

$P_{Nj}$ represents integral power in bandwidth of the $j^{th}$ pump channel of the span; and k represents the number of pump channels in the optical fiber link; and obtaining total nonlinear noise of the optical fiber link according to the nonlinear noise of the span in the optical fiber link, and obtaining a nonlinear transmission impairment of the optical fiber link.

Still another aspect of the present invention provides an apparatus for calculating a nonlinear transmission impairment of an optical fiber link, including:

a first obtaining unit, configured to determine that no pump channel exists in an optical fiber link, obtain a factor of intra-band nonlinear noise that is in the optical fiber link and does not pass through an optical filter, and obtain integral power in signal light bandwidth of a span in the optical fiber link;

a correction unit, configured to correct the factor of intra-band nonlinear noise that does not pass through an optical filter, to obtain a factor of intra-band nonlinear noise of the span in the optical fiber link that passes through an optical filter;

a calculation unit, configured to calculate nonlinear noise of the span in the optical fiber link by using the following formula:

$$P_{NL}=\alpha_{intra}(n)\cdot(P_S)^3;$$

where, $P_{NL}$ represents the nonlinear noise of the span;

$\alpha_{intra}(n)$ represents the factor of intra-band nonlinear noise of the span that passes through an optical filter;

n represents the number of optical filters through which a signal light of the span passes; and $P_S$ represents the integral power in the signal light bandwidth of the span;

a second obtaining unit, configured to obtain total nonlinear noise of the optical fiber link according to the nonlinear noise of the span in the optical fiber link; and a third obtaining unit, configured to obtain a nonlinear transmission impairment of the optical fiber link.

Yet another aspect of the present invention provides an apparatus for calculating a nonlinear transmission impairment of an optical fiber link, including:

a first obtaining unit, configured to determine that one or more pump channels exist in an optical fiber link, obtain a factor of intra-band nonlinear noise that is in the optical fiber link and does not pass through an optical filter and a factor of inter-band nonlinear noise that is in the optical fiber link and does not pass through an optical filter, and obtain integral power in signal light bandwidth of a span in the optical fiber link and integral power in pump channel bandwidth of the span in the optical fiber link;

a correction unit, configured to correct the factor of intra-band nonlinear noise that does not pass through an optical filter and the factor of inter-band nonlinear noise that does not pass through an optical filter, to obtain a factor of intra-band nonlinear noise of the span in the optical fiber link that passes through an optical filter and a factor of inter-band nonlinear noise of the span in the optical fiber link that passes through an optical filter;

a calculation unit, configured to calculate nonlinear noise of the span in the optical fiber link by using the following formula:

$$P_{NL}=\alpha_{intra}(n)\cdot(P_S)^3+\Sigma_{j=1}^k\alpha_{intra}(n,m)\cdot P_{S'}(P_{Nj})^2;$$

where, $P_{NL}$ represents the nonlinear noise of the span;

$\alpha_{intra}(n)$ represents the factor of intra-band nonlinear noise of the span that passes through an optical filter;

$\alpha_{inter}(n,m)$ represents the factor of inter-band nonlinear noise of the span that passes through an optical filter;

n represents the number of optical filters through which a signal light of the span passes, and m represents the number of optical filters through which a pump channel of the span passes;

$P_S$ represents the integral power in the signal light bandwidth of the span;

$P_{Nj}$ represents integral power in bandwidth of the $j^{th}$ pump channel of the span; and k represents the number of pump channels in the optical fiber link;

a second obtaining unit, configured to obtain total nonlinear noise of the optical fiber link according to the nonlinear noise of the span in the optical fiber link; and a third obtaining unit, configured to obtain a nonlinear transmission impairment of the optical fiber link.

According to the method and apparatus for calculating a nonlinear transmission impairment of an optical fiber link provided in the embodiments of the present invention, a nonlinear factor that is of an optical fiber link and does not pass through an optical filter is corrected, so as to obtain nonlinear noise that is of the optical fiber link and passes through an optical filter, thereby quickly and correctly calculating a nonlinear transmission impairment of the optical fiber link, saving system resources and calculation time, and reducing system costs.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Embodiments of the present invention provide a method and an apparatus for calculating a nonlinear transmission impairment of an optical fiber link. To make the technical solutions in the present invention more comprehensible, the following clearly describes the embodiments of the present invention with reference to the accompanying drawings.

It should be clarified that the described embodiments are only some exemplary embodiments of the present invention, rather than all embodiments of the present invention. All other embodiments obtained by a person of ordinary skill in the art based on the embodiments of the present invention without creative efforts shall fall within the protection scope of the present invention.

First, a principle on which the method and the apparatus for calculating a nonlinear transmission impairment of an optical fiber link in the embodiments of the present invention are based is described.

After an optical signal is filtered by multiple levels of optical filters, a spectral shape of the optical signal becomes increasingly narrow. The optical signal may be a signal light (signal light) or a pump channel (pump channel). The signal light is observed light, and the pump channel is light existing on all other channels except for the signal light.

Figure 1A:
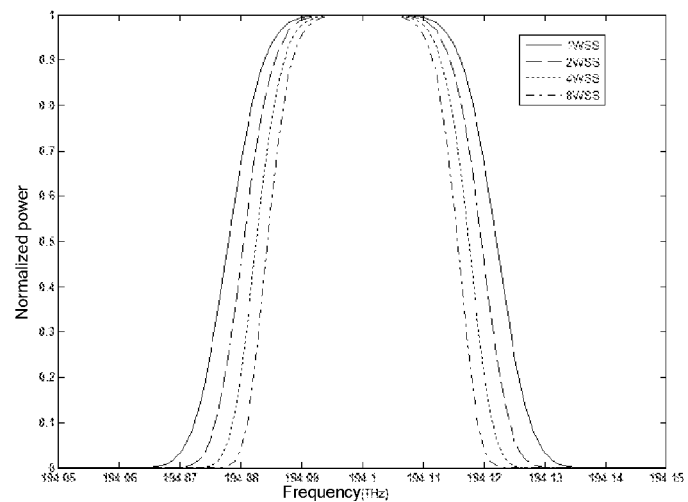
FIG. 1a is a filter spectral shape of cascading of different WSSs according to an embodiment of the present invention.

A wavelength selective switch (Wavelength Selective Switch, WSS) of an optical filter that is most frequently used on a long-distance dynamic optical network is used as an example. A filter function of the WSS for a spectrum may approximate a super Gaussian type. After an optical signal is filtered by multiple levels of WSSs, a spectral shape of the optical signal becomes increasingly narrow. FIG. 1a is a normalized filter spectral shape of cascading of different number of WSSs. It can be seen that if an optical signal passes through more levels of WSSs, a frequency spectrum of the signal is filtered to be narrower.

Figure 1B:
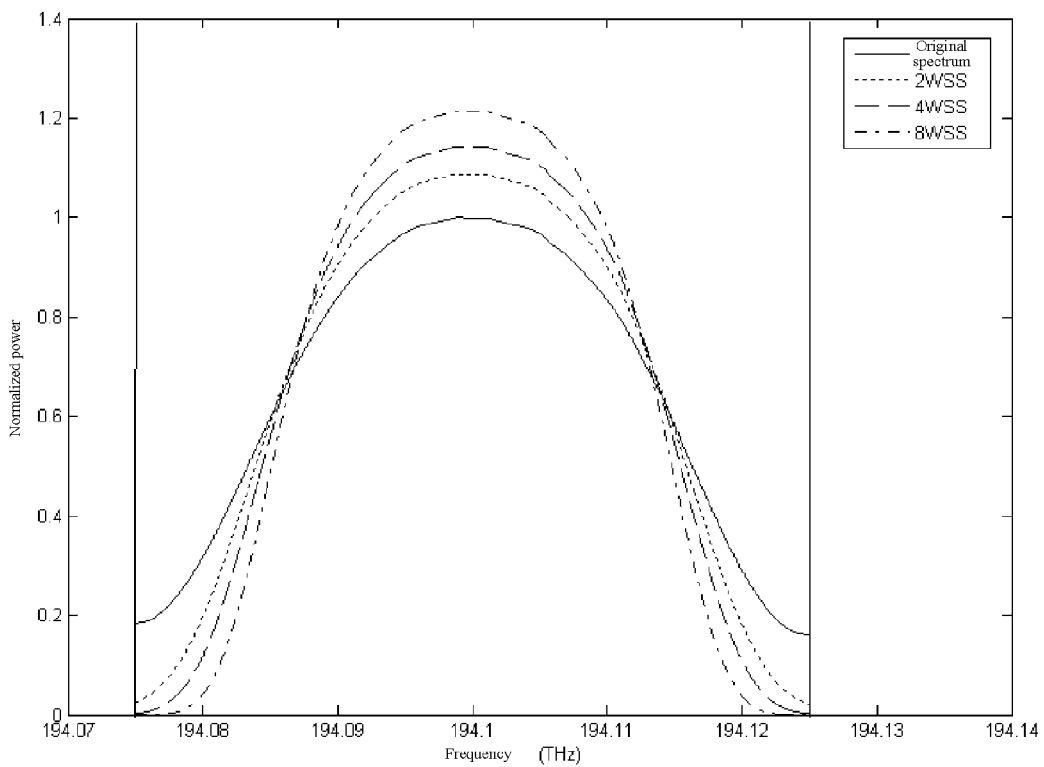
FIG. 1b is a spectrum of a signal passing through different cascaded WSSs while keeping the same signal integral power according to an embodiment of the present invention.

During power adjustment, an optical transmission system in principle adjusts integral power of each wavelength in an optical fiber link to target power. As a spectral shape filtered by multiple levels of WSSs becomes narrow, with same integral power, the more WSSs are passed, the higher peak power is. A change of spectral density of an optical signal causes a change of a nonlinear impairment of the optical signal in the optical fiber link. An optical fiber link whose bandwidth is 50 GHz is used as an example. FIG. 1b is a spectral shape of an optical signal after it passes through WSSs of different levels while keeping the same integral power in 50 GHz, and it can be seen that the more levels of WSSs are passed, and the higher peak power of the signal is.

A difference of a size of an impairment caused by a change of a WSS location is compared through simulation. For a coherent non-compensated link having 25 waves, a spacing of 50 GHz, and a transmission rate of 100 G, an observed signal wave is in the middlemost, an optical fiber link contains 20 spans, and each span has a length of 80 km. It is assumed that the optical fiber link contains four reconfigurable optical add/drop multiplexer (Reconfigurable Optical Add/Drop Multiplexer, ROADM) sites; each ROADM site contains two WSSs; each WSS filters a signal wave; incident power of all wavelengths of each span is 4 dBm; and ROADMs are separately arranged in the forepart of the link, that is, the first to the fourth spans, or the middle part of the link, that is, the ninth to the twelfth spans, or the rear part of the link, that is, the sixteenth to the nineteenth spans, or the ROADMs are evenly distributed in the link, that is, the fourth, the eighth, the twelfth, and the sixteenth spans. OSNR penalties of the ROADMs when they are arranged in different locations are compared in the simulation, as described in table 1. It can be seen that arrangements of the ROADMs in different locations of the link cause a great difference of an influence on a nonlinear transmission impairment.

TABLE 1

| WSS Location in a Link | OSNR Penalty (dB) |
| --- | --- |
| Without WSS | 4.49 |
| Span 1 to span 4 | 7.78 |
| Span 9 to span 12 | 6.92 |
| Span 16 to span 19 | 5.74 |
| Spans 4, 8, 12, and 16 | 6.81 |

Similarly, if an optical filter of any type is arranged in different locations of an optical fiber link, it causes different influences on a nonlinear transmission impairment of the optical fiber link. Therefore, when the nonlinear transmission impairment of the optical fiber link is being calculated, a nonlinear transmission impairment of each span in the optical fiber link needs to be calculated.

For an optical fiber link without dispersion compensation, nonlinear noise generated in the optical fiber link can be equivalent to Gaussian noise. Therefore, when a nonlinear transmission impairment of the optical fiber link is being calculated, the nonlinear noise and amplified spontaneous emission (Amplified Spontaneous Emission, ASE) noise generated by an amplifier in the link may be directly added together. In consideration that an OSNR of the sum of these two kinds of noise is called an equivalent OSNR, the equivalent OSNR may be defined as follows:

$$OSNR_{eq} = \frac{P_S}{P_{ASE} + P_{NL}} \quad (1)$$

$P_S$ is integral power of a signal light in the optical fiber link, $P_{ASE}$ is accumulated ASE power of the amplifier in the link, and $P_{NL}$ is the nonlinear noise.

It is assumed that a wavelength of only one signal light exists in the optical fiber link, so that nonlinear noise that is of one span and does not pass through an optical filter may be expressed as follows:

$$P_{NL} = \alpha_{intra} \cdot (P_S)^3 \quad (2)$$

It is assumed that (k+1) wavelengths exist in the optical fiber link, where one signal light exists, and k pump channels exist, so that the nonlinear noise that is of one span and does not pass through an optical filter may be expressed as follows:

$$P_{NL} = \alpha_{intra} \cdot (P_S)^3 + \sum_{j=1}^{k} \alpha_{inter} \cdot P_S \cdot (P_{Nj})^2 \quad (3)$$

$P_{Nj}$ is integral power in bandwidth of the $j^{th}$ pump channel of the span; $\alpha_{intra}$ is a factor of intra-band nonlinear noise that is in the optical fiber link and does not pass through an optical filter, $\alpha_{inter}$ is a factor of inter-band nonlinear noise that is in the optical fiber link and does not pass through an optical filter, and the two are parameters related to a transmitter characteristic of the signal light, an optical fiber link characteristic, and a network configuration parameter of an optical layer. The transmitter characteristic includes a transmitter modulation rate and a modulation code type; the optical fiber link characteristic includes an optical fiber category, a span length, the number of spans, and a dispersion topology; and the network configuration parameter of the optical layer includes wavelength spacing, the number of wavelengths, a modulation code type of neighboring wavelengths, and a modulation rate of the neighboring wavelengths.

After nonlinear noise of each span in the optical fiber link is obtained, superposition is performed for the nonlinear noise of each span to obtain total nonlinear noise of the optical fiber link. Coherent or incoherent superposition may be performed for the nonlinear noise of each span to obtain the total nonlinear noise of the optical fiber link. Therefore, an OSNR penalty of the optical fiber link in the case of a fixed bit error rate, that is, the nonlinear transmission impairment of the optical fiber link can be expressed as follows:

$$OSNR_{penalty} = \frac{P_S}{P_S - P_{NL} \cdot OSNR_{btb}} \quad (4)$$

$$= \frac{1}{1 - \frac{P_{NL}}{P_S} \cdot OSNR_{btb}}$$

$OSNR_{btb}$ is an OSNR value in the case of the fixed bit error rate and at the time of back to back (Back to Back, BTB):

$$OSNR_{btb} = \frac{P_S}{P_{ASE}} \quad (5)$$

For an optical fiber link that passes through an optical filter, because an optical signal is filtered, its spectral density changes, and in a situation that integral power is unchanged, peak power of the optical signal is higher than peak power of an optical signal that is not filtered. Accordingly, a factor of nonlinear noise that does not pass through an optical filter is corrected as follows:

If a signal light passes through n optical filters, a correction factor for a factor $\alpha_{intra}$ of intra-band nonlinear noise that does not pass through an optical filter is $$W1(n) = \left(\frac{P_{sp}^n}{P_{sp}^0}\right)^{k1},$$

and a correction factor for a factor $\alpha_{inter}$ of inter-band nonlinear noise is $$W2(n) = \left(\frac{P_{sp}^n}{P_{sp}^0}\right)^{k2};$$

and if a pump channel passes through m optical filters, the correction factor for the factor $\alpha_{inter}$ of inter-band nonlinear noise that does not pass through an optical filter is $$W3(m) = \left(\frac{P_{pp}^m}{P_{pp}^0}\right)^{k3}.$$

After the correction, factor of nonlinear noises that pass through an optical filter are obtained, including a factor $\alpha_{intra}(n)$ of intra-band nonlinear noise that passes through an optical filter and a factor $\alpha_{intra}(n,m)$ of inter-band nonlinear noise that passes through an optical filter:

$$\alpha_{intra}(n) = \alpha_{intra} \cdot W1(n) = \alpha_{intra} \cdot \left(\frac{P_{sp}^n}{P_{sp}^0}\right)^{k1} \quad (6)$$

$$\alpha_{inter}(n, m) = \alpha_{inter} \cdot W2(n) \cdot W3(m) = \alpha_{inter} \cdot \left(\frac{P_{sp}^n}{P_{sp}^0}\right)^{k2} \cdot \left(\frac{P_{pp}^m}{P_{pp}^0}\right)^{k3} \quad (7)$$

$P_{sp}^0$ is peak power of a signal light that is of the span and does not pass through an optical filter, $P_{sp}^0$ is peak power of a signal light of the span that passes through n optical filters, $P_{pp}^0$ is peak power of a pump channel that is of the span and does not pass through an optical filter, and $P_{pp}^m$ is peak power of a pump channel of the span that passes through m optical filters. $P_{sp}^0$ and $P_{pp}^0$ can be obtained by measuring an original spectrum that does not pass through an optical filter, and $P_{sp}^n$ and $P_{pp}^m$ can be obtained through actual measurement or calculation according to a filter function of the optical filter.

k1 is a correction constant of the factor of intra-band nonlinear noise when the signal light passes through an optical filter, k2 is a correction constant of the factor of inter-band nonlinear noise when the signal light passes through an optical filter, and k3 is a correction constant of the factor of inter-band nonlinear noise when the pump channel passes through an optical filter. k1, k2, and k3 are related to a transmitter characteristic of an optical signal and a parameter of a filter function of an optical filter, may be acquired through simulation or through an experiment, and may be acquired by specifically using the following method:

After spectral shapes of the signal light and the pump channel and a filter spectral shape of an optical filter are determined, a proportion of the peak power of the signal light that passes through an optical filter to the peak power of the signal light that does not pass through an optical filter is determined.

For k1, two single-wave single-span scenarios, a scenario in which the signal light passes through r optical filters and a scenario in which the signal light does not pass through an optical filter, may be simulated or experimented, so as to separately acquire an OSNR penalty of a single-span optical fiber link with certain power in these two scenarios, the nonlinear noise is calculated according to formula (4), and then the following is obtained through a calculation according to formula (2) and formula (6):

$$k1 = \log_{\left(\frac{P_{sp}^r}{P_{sp}^0}\right)} \left(\frac{\alpha_{intra}(r)}{\alpha_{intra}}\right) = \frac{\log_{10}\left(\frac{\alpha_{intra}(r)}{\alpha_{intra}}\right)}{\log_{10}\left(\frac{P_{sp}^r}{P_{sp}^0}\right)} \quad (8)$$

A k2 acquiring method is simulating or experimenting two two-wave single-span scenarios: scenario one: The signal light passes through r optical filters and the pump channel does not pass through an optical filter; and scenario two: neither the signal light nor the pump channel passes through an optical filter, so as to separately acquire an OSNR penalty of a two-wave single-span link with certain power in these two scenarios, the nonlinear noise is calculated according to formula (4), and then the following is obtained through a calculation according to formulas (3), (6), and (7):

$$k2 = \log_{\left(\frac{P_{sp}^r}{P_{sp}^0}\right)}\left(\frac{\alpha_{inter}(r,0)}{\alpha_{inter}}\right) = \frac{\log_{10}\left(\frac{\alpha_{inter}(r,0)}{\alpha_{inter}}\right)}{\log_{10}\left(\frac{P_{sp}^r}{P_{sp}^0}\right)} \quad (9)$$

A k3 acquiring method is simulating or experimenting two two-wave single-span scenarios: scenario one: The signal light does not pass through an optical filter and the pump channel passes through s optical filters; and scenario two: neither the signal light nor the pump channel passes through an optical filter, so as to separately acquire an OSNR penalty of a two-wave single-span link with certain power in these two scenarios, the nonlinear noise is calculated according to formula (4), and then the following is obtained through a calculation according to formulas (3) and (7):

$$k3 = \log_{\left(\frac{P_{pp}^s}{P_{pp}^0}\right)}\left(\frac{\alpha_{inter}(0,s)}{\alpha_{inter}}\right) = \frac{\log_{10}\left(\frac{\alpha_{inter}(0,s)}{\alpha_{inter}}\right)}{\log_{10}\left(\frac{P_{pp}^s}{P_{pp}^0}\right)} \quad (10)$$

According to a factor of nonlinear noise that is of each span in the optical fiber link and passes through an optical filter and with reference to formulas (2) and (3), nonlinear noise of each span in the optical fiber link is calculated as follows:

$$P_{NL} = \alpha_{intra}(n) \cdot (P_S)^3, k=0; \quad (11)$$

$$P_{NL} = \alpha_{intra}(n) \cdot (P_S)^3 + \Sigma_{j=1}^{k} \alpha_{intra}(n,m) \cdot P_S \cdot (P_{Nj})^2, k>0; \quad (12)$$

k represents the number of pump channels in the optical fiber link.

Afterwards, superposition is performed for the nonlinear noise of each span to obtain total nonlinear noise of the optical fiber link, and coherent or incoherent superposition may be performed for the nonlinear noise of each span to obtain the total nonlinear noise of the optical fiber link. Based on formula (4), an OSNR penalty of the optical fiber link in the case of a fixed bit error rate, that is, a nonlinear transmission impairment of the optical fiber link, may be obtained.

Figure 2A:
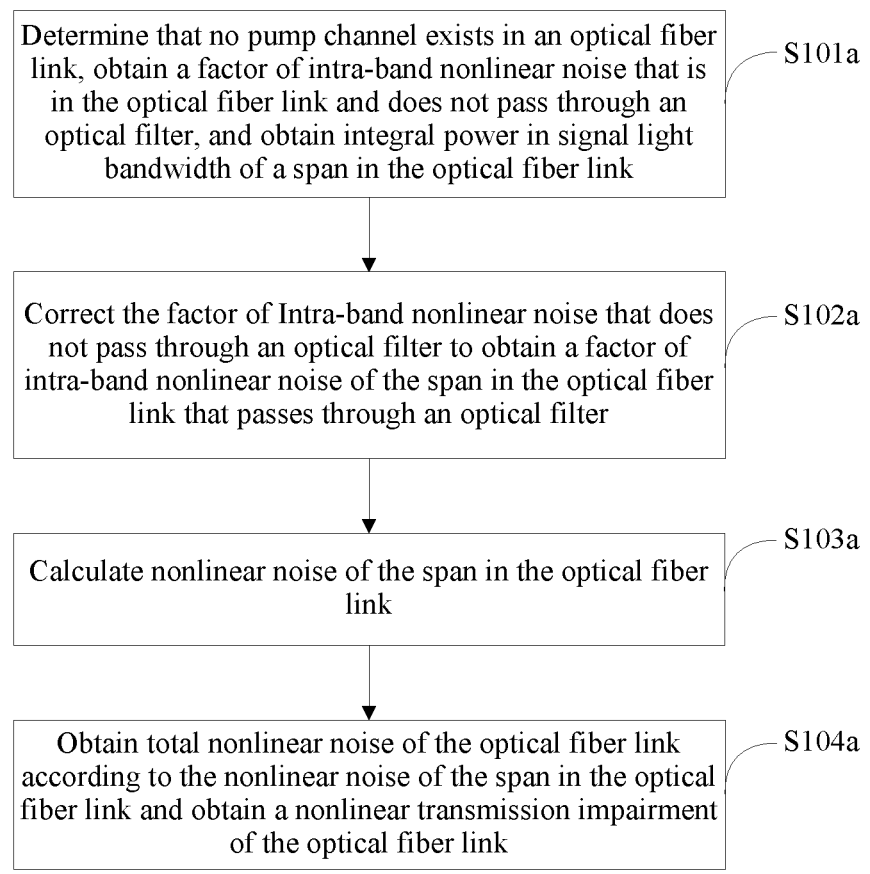
FIG. 2a is a flowchart of a method for calculating a nonlinear transmission impairment of an optical fiber link according to an embodiment of the present invention.

In an embodiment of the present invention, a process of a method for calculating a nonlinear transmission impairment of an optical fiber link is shown in FIG. 2a, and the method includes the following steps:

Step S101a: Determine that no pump channel exists in an optical fiber link, obtain a factor of intra-band nonlinear noise that in the optical fiber link and does not pass through an optical filter, and obtain integral power in signal light bandwidth of a span in the optical fiber link.

Step S102a: Correct the factor of intra-band nonlinear noise that does not pass through an optical filter, to obtain a factor of intra-band nonlinear noise of the span in the optical fiber link that passes through an optical filter.

Step S103a: Calculate nonlinear noise of the span in the optical fiber link by using the following formula:

$$P_{NL} = \alpha_{intra}(n) \cdot (P_S)^3;$$

where, $P_{NL}$ represents the nonlinear noise of the span;

$\alpha_{intra}(n)$ represents the factor of intra-band nonlinear noise of the span that passes through an optical filter;

n represents the number of optical filters through which a signal light of the span passes; and $P_S$ represents the integral power in the signal light bandwidth of the span.

Step S104a: Obtain total nonlinear noise of the optical fiber link according to the nonlinear noise of the span in the optical fiber link, and obtain a nonlinear transmission impairment of the optical fiber link.

Further, in step S104a, if multiple spans exist in the optical fiber link, that obtain total nonlinear noise of the optical fiber link according to the nonlinear noise of the span in the optical fiber link specifically includes:

performing superposition on nonlinear noise of the spans in the optical fiber link to obtain the total nonlinear noise of the optical fiber link.

Further, in step S102a, the factor of intra-band nonlinear noise of the span in the optical fiber link that passes through an optical filter is obtained by using the following formula:

$$\alpha_{intra}(n) = \alpha_{intra} \cdot \left(\frac{P_{sp}^n}{P_{sp}^0}\right)^{k1};$$

where, $\alpha_{intra}(n)$ represents the factor of intra-band nonlinear noise of the span that passes through an optical filter;

$\alpha_{intra}$ represents the factor of intra-band nonlinear noise that does not pass through an optical filter;

$P_{sp}^0$ represents peak power of a signal light that is of the span and does not pass through an optical filter;

$P_{sp}^n$ represents peak power of a signal light of the span that passes through n optical filters; and k1 represents a correction constant of the factor of intra-band nonlinear noise when the signal light passes through an optical filter.

Further, k1 is obtained by using the following formula:

$$k1 = \log_{\left(\frac{P_{sp}^r}{P_{sp}^0}\right)}\left(\frac{\alpha_{intra}(r)}{\alpha_{intra}}\right) = \frac{\log_{10}\left(\frac{\alpha_{intra}(r)}{\alpha_{intra}}\right)}{\log_{10}\left(\frac{P_{sp}^r}{P_{sp}^0}\right)};$$

where, $\alpha_{intra}(r)$ represents the factor of intra-band nonlinear noise of the span that passes through an optical filter when n=r;

$P_{sp}^r$ represents peak power of a signal light of the span that passes through r optical filters; and r is a positive integer.

Figure 2B:
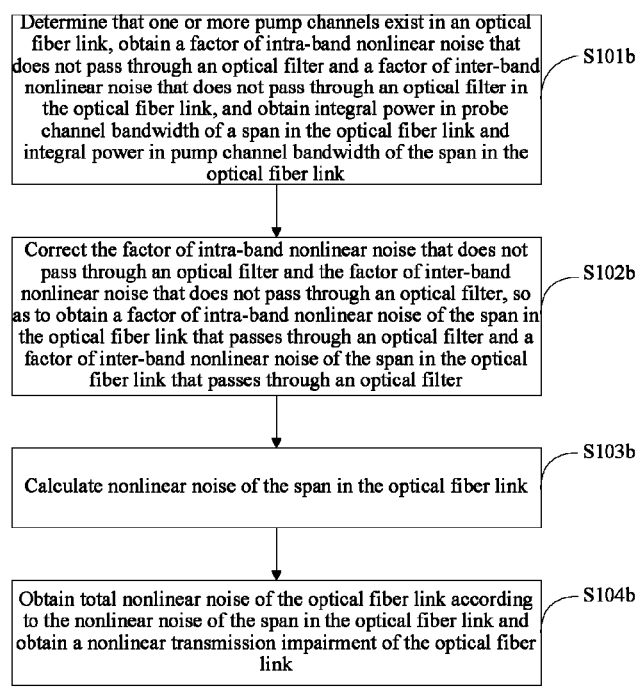
FIG. 2b is a flowchart of a method for calculating a nonlinear transmission impairment of an optical fiber link according to another embodiment of the present invention.

In another embodiment of the present invention, a process of a method for calculating a nonlinear transmission impairment of an optical fiber link is shown in FIG. 2b, and the method includes the following steps:

Step S101b: Determine that one or more pump channels exist in an optical fiber link, obtain a factor of intra-band nonlinear noise that is in the optical fiber link and does not pass through an optical filter and a factor of inter-band nonlinear noise that is in the optical fiber link and does not pass through an optical filter, and obtain integral power in signal light bandwidth of a span in the optical fiber link and integral power in pump channel bandwidth of the span in the optical fiber link.

Step S102b: Correct the factor of intra-band nonlinear noise that does not pass through an optical filter and the factor of inter-band nonlinear noise that does not pass through an optical filter, to obtain a factor of intra-band nonlinear noise of the span in the optical fiber link that passes through an optical filter and a factor of inter-band nonlinear noise of the span in the optical fiber link that passes through an optical filter.

Step S103b: Calculate nonlinear noise of the span in the optical fiber link by using the following formula:

$$P_{NL} = \alpha_{intra}(n) \cdot (P_S)^3 + \Sigma_{j=1}^k \alpha_{inter}(n,m) \cdot P_S \cdot (P_{Nj})^2;$$

where, $P_{NL}$ represents the nonlinear noise of the span;

$\alpha_{intra}(n)$ represents the factor of intra-band nonlinear noise of the span that passes through an optical filter;

$\alpha_{inter}(n,m)$ represents the factor of inter-band nonlinear noise of the span that passes through an optical filter;

n represents the number of optical filters through which a signal light of the span passes, and m represents the number of optical filters through which a pump channel of the span passes;

$P_S$ represents the integral power in the signal light bandwidth of the span;

$P_{Nj}$ represents integral power in bandwidth of the $j^{th}$ pump channel of the span; and k represents the number of pump channels in the optical fiber link.

Step S104b: Obtain total nonlinear noise of the optical fiber link according to the nonlinear noise of the span in the optical fiber link, and obtain a nonlinear transmission impairment of the optical fiber link.

Further, in step S104b, if multiple spans exist in the optical fiber link, that obtain total nonlinear noise of the optical fiber link according to the nonlinear noise of the span in the optical fiber link specifically includes:

performing superposition on nonlinear noise of the spans in the optical fiber link to obtain the total nonlinear noise of the optical fiber link.

Further, in step S102b, the factor of intra-band nonlinear noise of the span in the optical fiber link that passes through an optical filter is obtained by using the following formula:

$$\alpha_{intra}(n) = \alpha_{intra} \cdot \left(\frac{P_{sp}^n}{P_{sp}^0}\right)^{k1};$$

and the factor of inter-band nonlinear noise of the span in the optical fiber link that passes through an optical filter is obtained by using the following formula:

$$\alpha_{inter}(n,m) = \alpha_{inter} \cdot \left(\frac{P_{sp}^n}{P_{sp}^0}\right)^{k2} \cdot \left(\frac{P_{pp}^m}{P_{pp}^0}\right)^{k3};$$

where, $\alpha_{intra}(n)$ represents the factor of intra-band nonlinear noise of the span that passes through an optical filter;

$\alpha_{inter}(n,m)$ represents the factor of inter-band nonlinear noise of the span that passes through an optical filter;

$\alpha_{intra}$ represents the factor of intra-band nonlinear noise that does not pass through an optical filter;

$\alpha_{inter}$ represents the factor of inter-band nonlinear noise that does not pass through an optical filter;

$P_{sp}^0$ represents peak power of a signal light that is of the span and does not pass through an optical filter;

$P_{sp}^n$ represents peak power of a signal light of the span that passes through n optical filters;

$P_{pp}^0$ represents peak power of a pump channel that is of the span and does not pass through an optical filter;

$P_{pp}^m$ represents peak power of a pump channel of the span that passes through m optical filters;

k1 represents a correction constant of the factor of intra-band nonlinear noise when the signal light passes through an optical filter;

k2 represents a correction constant of the factor of inter-band nonlinear noise when the signal light passes through an optical filter; and k3 represents a correction constant of the factor of inter-band nonlinear noise when the pump channel passes through an optical filter.

Further, k1 is obtained by using the following formula:

$$k1 = \log_{\left(\frac{P_{sp}^r}{P_{sp}^0}\right)} \left(\frac{\alpha_{intra}(r)}{\alpha_{intra}}\right) = \frac{\log_{10}\left(\frac{\alpha_{intra}(r)}{\alpha_{intra}}\right)}{\log_{10}\left(\frac{P_{sp}^r}{P_{sp}^0}\right)};$$

k2 is obtained by using the following formula:

$$k2 = \log_{\left(\frac{P_{sp}^r}{P_{sp}^0}\right)} \left(\frac{\alpha_{inter}(r,0)}{\alpha_{inter}}\right) = \frac{\log_{10}\left(\frac{\alpha_{inter}(r,0)}{\alpha_{inter}}\right)}{\log_{10}\left(\frac{P_{sp}^r}{P_{sp}^0}\right)};$$

and k3 is obtained by using the following formula:

$$k3 = \log_{\left(\frac{P_{pp}^s}{P_{pp}^0}\right)} \left(\frac{\alpha_{inter}(0,s)}{\alpha_{inter}}\right) = \frac{\log_{10}\left(\frac{\alpha_{inter}(0,s)}{\alpha_{inter}}\right)}{\log_{10}\left(\frac{P_{pp}^s}{P_{pp}^0}\right)};$$

where, $\alpha_{intra}(r)$ represents a factor of intra-band nonlinear noise of the span that passes through an optical filter when n=r;

$\alpha_{intra}(r,0)$ represents a factor of inter-band nonlinear noise of the span that passes through an optical filter when n=r, m=0;

$\alpha_{inter}(0,s)$ represents a factor of inter-band nonlinear noise of the span that passes through an optical filter when n=0, m=s;

$P_{sp}^r$ represents peak power of a signal light of the span that passes through r optical filters;

$P_{pp}^s$ represents peak power of a pump channel of the span that passes through s optical filters; and r and s are positive integers.

With reference to accompanying drawings, the following describes in detail a method and an apparatus for calculating a nonlinear transmission impairment of an optical fiber link that are provided in the embodiments of the present invention.

It should be noted that the described embodiments are only some exemplary embodiments of the present invention, rather than all embodiments of the present invention. All other embodiments obtained by a person of ordinary skill in the art based on the embodiments of the present invention without creative efforts shall fall within the protection scope of the present invention.

In the following embodiments, an optical fiber link is a wavelength channel and refers to a link from a sending end to a receiving end.

Embodiment 1

Figure 3:
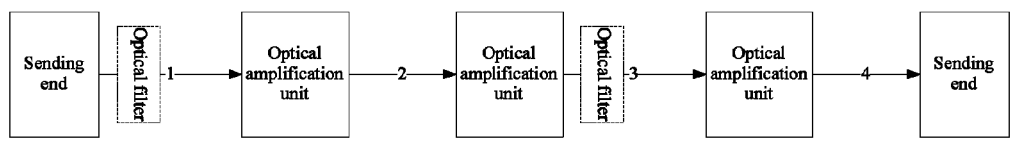
FIG. 3 is a schematic topology diagram of an optical fiber link according to an embodiment of the present invention.

This embodiment of the present invention provides a method for calculating a nonlinear transmission impairment of an optical fiber link. As shown in FIG. 3, an optical fiber link includes only one signal light wavelength and contains four spans in total, where input places of the first span and the third span separately have one optical filter for filtering a signal light. The method specifically includes the following steps:

Step S201: Determine that no pump channel exists in an optical fiber link, obtain a factor of intra-band nonlinear noise that is in the optical fiber link and does not pass through an optical filter, and obtain integral power in signal light bandwidth of a span in the optical fiber link.

Factor of nonlinear noises include a factor $\alpha_{intra}$ of intra-band nonlinear noise and a factor $\alpha_{inter}$ of inter-band nonlinear noise, and the two are parameters related to a transmitter characteristic of a signal light, an optical fiber link characteristic, and a network configuration parameter of an optical layer. The factor $\alpha_{intra}$ of intra-band nonlinear noise that does not pass through an optical filter and a factor $\alpha_{inter}$ of inter-band nonlinear noise that does not pass an optical filter can be obtained by performing measurement or simulation.

In this embodiment, no pump channel exists in the optical fiber link, the factor of intra-band nonlinear noise that is in the optical fiber link and does not pass through an optical filter is obtained, and the factor of inter-band nonlinear noise that does not pass an optical filter does not need to be obtained.

The integral power in the signal light bandwidth of the span in the optical fiber link may be obtained through device measurement or through a calculation according to each parameter of the link.

Step S202: Correct the factor of intra-band nonlinear noise that does not pass through an optical filter, to obtain a factor of intra-band nonlinear noise of the span in the optical fiber link that passes through an optical filter.

An empirical value may be used as a correction factor to correct the factor of intra-band nonlinear noise that does not pass through an optical filter, so as to obtain the factor of intra-band nonlinear noise of the span in the optical fiber link that passes through an optical filter; or the factor of intra-band nonlinear noise that does not pass through an optical filter may be corrected according to formula (6), so as to calculate and obtain the factor of intra-band nonlinear noise that passes through an optical filter.

In this embodiment, the factor of intra-band nonlinear noise that passes through an optical filter is calculated by using formula (6):

A factor of intra-band nonlinear noise of the first span where a signal light passes one optical filter is:

$$\alpha_{intra\_1}(1) = \alpha_{intra} \cdot \left(\frac{P^1_{sp\_1}}{P^0_{sp\_1}}\right)^{k1};$$

a factor of intra-band nonlinear noise of the second span where a signal light passes one optical filter is:

$$\alpha_{intra\_2}(1) = \alpha_{intra} \cdot \left(\frac{P^1_{sp\_2}}{P^0_{sp\_2}}\right)^{k1};$$

a factor of intra-band nonlinear noise of the third span where a signal light that passes two optical filters is:

$$\alpha_{intra\_3}(2) = \alpha_{intra} \cdot \left(\frac{P^2_{sp\_3}}{P^0_{sp\_3}}\right)^{k1};$$

and a factor of intra-band nonlinear noise of the fourth span where a signal light passes two optical filters is:

$$\alpha_{intra\_4}(2) = \alpha_{intra} \cdot \left(\frac{P^2_{sp\_4}}{P^0_{sp\_4}}\right)^{k1}.$$

$\alpha_{intra\_i}(n)$ (i=1, 2, 3, 4) represents a factor of intra-band nonlinear noise that is of the $i^{th}$ span and passes through an optical filter.

Step S203: Calculate nonlinear noise of the span in the optical fiber link.

In this embodiment, only one signal light wavelength exists, and the nonlinear noise of the span in the optical fiber link is calculated according to formula (11) as follows:

nonlinear noise of the first span is:

$$P_{NL1} = \alpha_{intra\_1}(1) \cdot (P_{S1})^3$$
$$= \alpha_{intra} \cdot \left(\frac{P^1_{sp\_1}}{P^0_{sp\_1}}\right)^{k1} \cdot (P_{S1})^3;$$

nonlinear noise of the second span is:

$$P_{NL2} = \alpha_{intra\_2}(1) \cdot (P_{S2})^3$$
$$= \alpha_{intra} \cdot \left(\frac{P^1_{sp\_2}}{P^0_{sp\_2}}\right)^{k1} \cdot (P_{S2})^3;$$

nonlinear noise of the third span is:

$$P_{NL3} = \alpha_{intra\_3}(2) \cdot (P_{S3})^3$$
$$= \alpha_{intra} \cdot \left(\frac{P^2_{sp\_3}}{P^0_{sp\_3}}\right)^{k1} \cdot (P_{S3})^3;$$

and nonlinear noise of the fourth span is:

$$P_{NL4} = \alpha_{intra\_4}(2) \cdot (P_{S4})^3$$

$$= \alpha_{intra} \cdot \left(\frac{P_{sp\_4}^2}{P_{sp\_4}^0}\right)^{k1} \cdot (P_{S4})^3.$$

$P_{Si}$ (i=1, 2, 3, 4) is integral optical power in signal bandwidth of an incident place of the $i^{th}$ span.

Step S204: Obtain total nonlinear noise of the optical fiber link according to the nonlinear noise of the span in the optical fiber link, and obtain a nonlinear transmission impairment of the optical fiber link.

If only one span exists in the optical fiber link, nonlinear noise of the span is the total nonlinear noise of the optical fiber link; and if multiple spans exist in the optical fiber link, superposition is performed for nonlinear noise of the spans in the optical fiber link to obtain the total nonlinear noise of the optical fiber link.

In this embodiment, multiple spans exist in the optical fiber link, and coherent or incoherent superposition is performed for nonlinear noise $P_{NL1}$, $P_{NL2}$, $P_{NL3}$, and $P_{NL4}$ of each span to obtain the total nonlinear noise $P_{NL}$ of the optical fiber link.

If integral optical power in signal bandwidth of an incident place of each span is the same and is $P_S$, the nonlinear transmission impairment of the optical fiber link is calculated directly according to formula (4).

If the integral optical power in the signal bandwidth of the incident place of each span is different, incident power of the first span is $P_{S1}$, and generated nonlinear noise is $P_{NL1}$; incident power of the second span is $P_{S2}$, and generated nonlinear noise is $P_{NL2}$; and incident power of the third span is $P_{S3}$, and generated nonlinear noise is $P_{NL3}$. The integral optical power in the signal bandwidth of the incident place of each span may be scaled to same equivalent incident power $P_S$.

If it is assumed that $$\beta_1 = \frac{P_{S1}}{P_S},$$

$$\beta_2 = \frac{P_{S2}}{P_S},$$

and $$\beta_3 = \frac{P_{S3}}{P_S},$$

the nonlinear noise generated by the first span after the scaling is $P_{NL1}' = P_{NL1} \cdot \beta_1$, the nonlinear noise generated by the second span after the scaling is $P_{NL2}' = P_{NL2} \cdot \beta_2$, and the nonlinear noise generated by the third span after the scaling is $P_{NL3}' = P_{NL3} \cdot \beta_3$.

Superposition is performed for the noise of each span after the scaling to obtain the total nonlinear noise $P_{NL}'$ of the optical fiber link, and the equivalent incident power $P_S$ and the total nonlinear noise $P_{NL}'$ of the optical fiber link are substituted into formula (4) to calculate the nonlinear transmission impairment of the optical fiber link.

$$OSNR_{penalty} = \frac{P_S}{P_S - P_{NL}' \cdot OSNR_{btb}}$$

$$= \frac{1}{1 - \frac{P_{NL}'}{P_S} \cdot OSNR_{btb}}$$

Embodiment 2

This embodiment of the present invention provides a method for calculating a nonlinear transmission impairment of an optical fiber link. As shown in FIG. 3, two wavelengths, one signal wavelength and one pump wavelength, exist in an optical fiber link. Four spans are contained in total, and input places of the first span and the third span separately include one optical filter filtering a signal light. Only the signal light is filtered, and a pump channel is not filtered. The method specifically includes the following steps:

Step S301: Determine that one or more pump channels exist in an optical fiber link, obtain a factor of intra-band nonlinear noise that is in the optical fiber link and does not pass through an optical filter and a factor of inter-band nonlinear noise that is in the optical fiber link and does not pass through an optical filter, and obtain integral power in signal light bandwidth of a span in the optical fiber link and integral power in pump channel bandwidth of the span in the optical fiber link.

In this embodiment, one pump channel exists in the optical fiber link, and the factor of intra-band nonlinear noise that does not pass through an optical filter and the factor of inter-band nonlinear noise that does not pass an optical filter in the optical fiber link are obtained.

Similar to step S201 in Embodiment 1, the factor $\alpha_{intra}$ of intra-band nonlinear noise that does not pass through an optical filter and the factor $\alpha_{inter}$ of inter-band nonlinear noise that does not pass an optical filter may be obtained by performing measurement or simulation.

The integral power in the signal light bandwidth of the span in the optical fiber link and the integral power in the pump channel bandwidth of the span in the optical fiber link are obtained, and these two may be obtained through device measurement or through a calculation according to each parameter of the link.

Step S302: Correct the factor of intra-band nonlinear noise that does not pass through an optical filter and the factor of inter-band nonlinear noise that does not pass through an optical filter, to obtain a factor of intra-band nonlinear noise of the span in the optical fiber link that passes through an optical filter and a factor of inter-band nonlinear noise of the span in the optical fiber link that passes through an optical filter.

An empirical value may be used as a correction factor to correct the factor of intra-band nonlinear noise that does not pass through an optical filter and the factor of inter-band nonlinear noise that does not pass through an optical filter, so as to obtain the factor of intra-band nonlinear noise of the span in the optical fiber link that passes through an optical filter and the factor of inter-band nonlinear noise of the span in the optical fiber link that passes through an optical filter; or the factor of intra-band nonlinear noise that does not pass through an optical filter may be corrected according to formula (6), so as to calculate and obtain the factor of intra-band nonlinear noise that passes through an optical filter, and the factor of inter-band nonlinear noise that does not pass through an optical filter may be corrected according to formula (7), so as to calculate and obtain the factor of inter-band nonlinear noise that passes through an optical filter.

In this embodiment, the factor of intra-band nonlinear noise that passes through an optical filter is calculated by using formula (6), and the factor of inter-band nonlinear noise that passes through an optical filter is calculated by using formula (7). Only the signal light is filtered, and the pump channel is not filtered.

A factor of intra-band nonlinear noise of the first span where a signal light passes one optical filter is:

$$\alpha_{intra\_1}(1) = \alpha_{intra} \cdot \left(\frac{P^1_{sp\_1}}{P^0_{sp\_1}}\right)^{k1};$$

a factor of inter-band nonlinear noise of the first span where a signal light passes through one optical filter and a pump channel does not pass through an optical filter is:

$$\alpha_{inter\_1}(1, 0) = \alpha_{inter} \cdot \left(\frac{P^1_{sp\_1}}{P^0_{sp\_1}}\right)^{k2} \cdot \left(\frac{P^0_{pp\_1}}{P^0_{pp\_1}}\right)^{k3}$$
$$= \alpha_{inter} \cdot \left(\frac{P^1_{sp\_1}}{P^0_{sp\_1}}\right)^{k2};$$

a factor of intra-band nonlinear noise of the second span where a signal light passes one optical filter is:

$$\alpha_{intra\_2}(1) = \alpha_{intra} \cdot \left(\frac{P^1_{sp\_2}}{P^0_{sp\_2}}\right)^{k1};$$

a factor of inter-band nonlinear noise of the second span where a signal light passes through one optical filter and a pump channel does not pass through an optical filter is:

$$\alpha_{inter\_2}(1, 0) = \alpha_{inter} \cdot \left(\frac{P^1_{sp\_2}}{P^0_{sp\_2}}\right)^{k2} \cdot \left(\frac{P^0_{pp\_2}}{P^0_{pp\_2}}\right)^{k3}$$
$$= \alpha_{inter} \cdot \left(\frac{P^1_{sp\_2}}{P^0_{sp\_2}}\right)^{k2};$$

a factor of intra-band nonlinear noise of the third span where a signal light passes through two optical filters is:

$$\alpha_{intra\_3}(2) = \alpha_{intra} \cdot \left(\frac{P^2_{sp\_3}}{P^0_{sp\_3}}\right)^{k1};$$

a factor of inter-band nonlinear noise of the third span where a signal light passes through two optical filters and a pump channel does not pass through an optical filter is:

$$\alpha_{inter\_3}(2, 0) = \alpha_{inter} \cdot \left(\frac{P^2_{sp\_3}}{P^0_{sp\_3}}\right)^{k2} \cdot \left(\frac{P^0_{pp\_3}}{P^0_{pp\_3}}\right)^{k3}$$
$$= \alpha_{inter} \cdot \left(\frac{P^2_{sp\_3}}{P^0_{sp\_3}}\right)^{k2};$$

a factor of intra-band nonlinear noise of the fourth span where a signal light that passes through two optical filters is:

$$\alpha_{intra\_4}(2) = \alpha_{intra} \cdot \left(\frac{P^2_{sp\_4}}{P^0_{sp\_4}}\right)^{k1};$$

and a factor of inter-band nonlinear noise of the fourth span where a signal light passes through two optical filters and a pump channel does not pass through an optical filter is:

$$\alpha_{inter\_4}(2, 0) = \alpha_{inter} \cdot \left(\frac{P^2_{sp\_4}}{P^0_{sp\_4}}\right)^{k2} \cdot \left(\frac{P^0_{pp\_4}}{P^0_{pp\_4}}\right)^{k3} = \alpha_{inter} \cdot \left(\frac{P^2_{sp\_4}}{P^0_{sp\_4}}\right)^{k2}.$$

$\alpha_{intra\_i}(n)$ (i=1, 2, 3, 4) represents a factor of intra-band nonlinear noise that is of the $i^{th}$ span and passes through an optical filter, and $\alpha_{inter\_i}(n,m)$ (i=1, 2, 3, 4) represents a factor of inter-band nonlinear noise that is of the $i^{th}$ span and passes through an optical filter.

Step S303: Calculate nonlinear noise of the span in the optical fiber link.

In this embodiment, one signal wavelength and one pump wavelength exist, only the signal light is filtered, the pump channel is not filtered, and nonlinear noise of each span is calculated according to formula (12).

Nonlinear noise of the first span is:

$$P_{NL1} = \alpha_{intra\_1}(1) \cdot (P_{S1})^3 + \sum_{j=1}^{k} \alpha_{inter\_1}(1, 0) \cdot P_{S1} \cdot (P_{Nj\_1})^2$$
$$= \alpha_{intra} \cdot \left(\frac{P^1_{sp\_1}}{P^0_{sp\_1}}\right)^{k1} \cdot (P_{S1})^3 + \alpha_{inter} \cdot \left(\frac{P^1_{sp\_1}}{P^0_{sp\_1}}\right)^{k2} \cdot P_{S1} \cdot (P_{N1\_1})^2;$$

nonlinear noise of the second span is:

$$P_{NL2} = \alpha_{intra\_2}(1) \cdot (P_{S2})^3 + \sum_{j=1}^{k} \alpha_{inter\_2}(1, 0) \cdot P_{S2} \cdot (P_{Nj\_2})^2$$
$$= \alpha_{intra} \cdot \left(\frac{P^1_{sp\_2}}{P^0_{sp\_2}}\right)^{k1} \cdot (P_{S2})^3 + \alpha_{inter} \cdot \left(\frac{P^1_{sp\_2}}{P^0_{sp\_2}}\right)^{k2} \cdot P_{S2} \cdot (P_{N1\_2})^2;$$

nonlinear noise of the third span is:

$$P_{NL3} = \alpha_{intra\_3}(2) \cdot (P_{S3})^3 + \sum_{j=1}^{k} \alpha_{inter\_3}(2, 0) \cdot P_{S3} \cdot (P_{Nj\_3})^2$$
$$= \alpha_{intra} \cdot \left(\frac{P^2_{sp\_3}}{P^0_{sp\_3}}\right)^{k1} \cdot (P_{S3})^3 + \alpha_{inter} \cdot \left(\frac{P^2_{sp\_3}}{P^0_{sp\_3}}\right)^{k2} \cdot P_{S3} \cdot (P_{N1\_3})^2;$$

and nonlinear noise of the fourth span is:

$$P_{NL4} = \alpha_{intra\_4}(2) \cdot (P_{S4})^3 + \sum_{j=1}^{k} \alpha_{inter\_4}(2, 0) \cdot P_{S4} \cdot (P_{Nj\_4})^2$$

$$= \alpha_{intra} \cdot \left(\frac{P_{sp\_4}^2}{P_{sp\_4}^0}\right)^{k1} \cdot (P_{S4})^3 + \alpha_{inter} \cdot \left(\frac{P_{sp\_4}^2}{P_{sp\_4}^0}\right)^{k2} \cdot P_{S4} \cdot (P_{N1\_4})^2.$$

$P_{Si}$ (i=1, 2, 3, 4) is integral optical power in signal bandwidth at an incident place of the ith span; k is the number of pump channels, where k=1 in this embodiment; and $P_{Nj\_i}$ (i=1, 2, 3, 4) is integral optical power in bandwidth of the jth pump optical channel at the incident place of the ith span.

Step S304: Obtain total nonlinear noise of the optical fiber link according to the nonlinear noise of the span in the optical fiber link, and obtain a nonlinear transmission impairment of the optical fiber link.

If only one span exists in the optical fiber link, nonlinear noise of the span is the total nonlinear noise of the optical fiber link; and if multiple spans exist in the optical fiber link, superposition is performed for nonlinear noise of the spans in the optical fiber link to obtain the total nonlinear noise of the optical fiber link.

In this embodiment, multiple spans exist in the optical fiber link, and coherent or incoherent superposition is performed for nonlinear noise $P_{NL1}$, $P_{NL2}$, $P_{NL3}$, and $P_{NL4}$ of each span to obtain the total nonlinear noise $P_{NL}$ of the optical fiber link.

Similar to step S204 in Embodiment 1, if integral optical power in signal bandwidth at an incident place of each span is the same and is $P_S$, the nonlinear transmission impairment of the optical fiber link is calculated directly according to formula (4); and if the integral optical power in the signal bandwidth at the incident place of each span is different, superposition is performed for scaled noise of each span to obtain the total nonlinear noise $P_{NL}'$ of the optical fiber link, and equivalent incident power $P_S$ and the total nonlinear noise $P_{NL}'$ of the optical fiber link are substituted into formula (4) to calculate the nonlinear transmission impairment of the optical fiber link.

Embodiment 3

This embodiment of the present invention provides a method for calculating a nonlinear transmission impairment of an optical fiber link. As shown in FIG. 3, two wavelengths, one signal wavelength and one pump wavelength, exist in an optical fiber link. Four spans are contained in total, and input places of the first span and the third span separately include one optical filter filtering a pump channel. Only the pump channel is filtered, and a signal light is not filtered. The method specifically includes the following steps:

Step S401: Determine that one or more pump channels exist in an optical fiber link, obtain a factor of intra-band nonlinear noise that is in the optical fiber link and does not pass through an optical filter and a factor of inter-band nonlinear noise that is in the optical fiber link and does not pass through an optical filter, and obtain integral power in signal light bandwidth of a span in the optical fiber link and integral power in pump channel bandwidth of the span in the optical fiber link.

In this embodiment, one pump channel exists in the optical fiber link, and the factor of intra-band nonlinear noise that does not pass through an optical filter and the factor of inter-band nonlinear noise that does not pass an optical filter in the optical fiber link are obtained.

Similar to step S201 in Embodiment 1, the factor $\alpha_{intra}$ of intra-band nonlinear noise that does not pass through an optical filter and the factor $\alpha_{inter}$ of inter-band nonlinear noise that does not pass an optical filter may be obtained by performing measurement or simulation.

The integral power in the signal light bandwidth of the span in the optical fiber link and the integral power in the pump channel bandwidth of the span in the optical fiber link are obtained, and these two may be obtained through device measurement or through a calculation according to each parameter of the link.

Step S402: Correct the factor of intra-band nonlinear noise that does not pass through an optical filter and the factor of inter-band nonlinear noise that does not pass through an optical filter, to obtain a factor of intra-band nonlinear noise of the span in the optical fiber link that passes through an optical filter and a factor of inter-band nonlinear noise of the span in the optical fiber link that passes through an optical filter.

An empirical value may be used as a correction factor to correct the factor of intra-band nonlinear noise that does not pass through an optical filter and the factor of inter-band nonlinear noise that does not pass through an optical filter, so as to obtain the factor of intra-band nonlinear noise of the span in the optical fiber link that passes through an optical filter and the factor of inter-band nonlinear noise of the span in the optical fiber link that passes through an optical filter; or the factor of intra-band nonlinear noise that does not pass through an optical filter may be corrected according to formula (6), so as to calculate and obtain the factor of intra-band nonlinear noise that passes through an optical filter, and the factor of inter-band nonlinear noise that does not pass through an optical filter may be corrected according to formula (7), so as to calculate and obtain the factor of inter-band nonlinear noise that passes through an optical filter.

In this embodiment, only the pump channel is filtered, and the signal light is not filtered. A factor of intra-band nonlinear noise that is of each span and does not pass through an optical filter is $\alpha_{intra}$. It may also be obtained, through a calculation by using formula (6), that the factor of intra-band nonlinear noise that is of each span and does not pass through an optical filter is $\alpha_{intra}$. The factor of inter-band nonlinear noise that passes through an optical filter is calculated by using formula (7).

A factor of inter-band nonlinear noise of the first span where a pump channel passes through one optical filter and a signal light does not pass through an optical filter is:

$$\alpha_{inter\_1}(0, 1) = \alpha_{inter} \cdot \left(\frac{P_{sp\_1}^0}{P_{sp\_1}^0}\right)^{k2} \cdot \left(\frac{P_{pp\_1}^1}{P_{pp\_1}^0}\right)^{k3} = \alpha_{inter} \cdot \left(\frac{P_{pp\_1}^1}{P_{pp\_1}^0}\right)^{k3};$$

a factor of inter-band nonlinear noise of the second span where a pump channel passes through one optical filter and a signal light does not pass through an optical filter is:

$$\alpha_{inter\_2}(0, 1) = \alpha_{inter} \cdot \left(\frac{P_{sp\_2}^0}{P_{sp\_2}^0}\right)^{k2} \cdot \left(\frac{P_{pp\_2}^1}{P_{pp\_2}^0}\right)^{k3} = \alpha_{inter} \cdot \left(\frac{P_{pp\_2}^1}{P_{pp\_2}^0}\right)^{k3};$$

a factor of inter-band nonlinear noise of the third span where a pump channel passes through two optical filters and a signal light does not pass through an optical filter is:

$$\alpha_{inter\_3}(0, 2) = \alpha_{inter} \cdot \left(\frac{P^0_{sp\_3}}{P^0_{sp\_3}}\right)^{k2} \cdot \left(\frac{P^2_{pp\_3}}{P^0_{pp\_3}}\right)^{k3} = \alpha_{inter} \cdot \left(\frac{P^2_{pp\_3}}{P^0_{pp\_3}}\right)^{k3};$$

and a factor of inter-band nonlinear noise of the fourth span where a pump channel passes through two optical filters and a signal light does not pass through an optical filter is:

$$\alpha_{inter\_4}(0, 2) = \alpha_{inter} \cdot \left(\frac{P^0_{sp\_4}}{P^0_{sp\_4}}\right)^{k2} \cdot \left(\frac{P^2_{pp\_4}}{P^0_{pp\_4}}\right)^{k3} = \alpha_{inter} \cdot \left(\frac{P^2_{pp\_4}}{P^0_{pp\_4}}\right)^{k3}.$$

$\alpha_{inter\_i}(n,m)$ (i=1, 2, 3, 4) is a factor of inter-band nonlinear noise that is of the $i^{th}$ span and passes through an optical filter.

Step S403: Calculate nonlinear noise of the span in the optical fiber link.

In this embodiment, one signal wavelength and one pump wavelength exist, only the pump channel is filtered, the signal light is not filtered, and nonlinear noise of each span is calculated according to formula (12).

Nonlinear noise of the first span is:

$$P_{NL1} = \alpha_{intra} \cdot (P_{S1})^3 + \sum_{j=1}^{k} \alpha_{inter\_1}(0, 1) \cdot P_{S1} \cdot (P_{Nj\_1})^2$$

$$= \alpha_{intra} \cdot (P_{S1})^3 + \alpha_{inter} \cdot \left(\frac{P^1_{pp\_1}}{P^0_{pp\_1}}\right)^{k3} \cdot P_{S1} \cdot (P_{N1\_1})^2;$$

nonlinear noise of the second span is:

$$P_{NL2} = \alpha_{intra} \cdot (P_{S2})^3 + \sum_{j=1}^{k} \alpha_{inter\_2}(0, 1) \cdot P_{S2} \cdot (P_{Nj\_2})^2$$

$$= \alpha_{intra} \cdot (P_{S2})^3 + \alpha_{inter} \cdot \left(\frac{P^1_{pp\_2}}{P^0_{pp\_2}}\right)^{k3} \cdot P_{S2} \cdot (P_{N1\_2})^2;$$

nonlinear noise of the third span is:

$$P_{NL3} = \alpha_{intra} \cdot (P_{S3})^3 + \sum_{j=1}^{k} \alpha_{inter\_3}(0, 2) \cdot P_{S3} \cdot (P_{Nj\_3})^2$$

$$= \alpha_{intra} \cdot (P_{S3})^3 + \alpha_{inter} \cdot \left(\frac{P^2_{pp\_3}}{P^0_{pp\_3}}\right)^{k3} \cdot P_{S3} \cdot (P_{N1\_3})^2;$$

and nonlinear noise of the fourth span is:

$$P_{NL4} = \alpha_{intra} \cdot (P_{S4})^3 + \sum_{j=1}^{k} \alpha_{inter\_4}(0, 2) \cdot P_{S4} \cdot (P_{Nj\_4})^2$$

-continued $$= \alpha_{intra} \cdot (P_{S4})^3 + \alpha_{inter} \cdot \left(\frac{P^2_{pp\_4}}{P^0_{pp\_4}}\right)^{k3} \cdot P_{S4} \cdot (P_{N1\_4})^2.$$

$P_{Si}$ (i=1, 2, 3, 4) is integral optical power in signal bandwidth at an incident place of the $i^{th}$ span; k is the number of pump channels, where k=1 in this embodiment; and $P_{Nj\_i}$ (i=1, 2, 3, 4) is integral optical power in bandwidth of the $j^{th}$ pump optical channel at the incident place of the $i^{th}$ span.

Step S404: Obtain total nonlinear noise of the optical fiber link according to the nonlinear noise of the span in the optical fiber link, and obtain a nonlinear transmission impairment of the optical fiber link.

If only one span exists in the optical fiber link, nonlinear noise of the span is the total nonlinear noise of the optical fiber link; and if multiple spans exist in the optical fiber link, superposition is performed for nonlinear noise of the spans in the optical fiber link to obtain the total nonlinear noise of the optical fiber link.

In this embodiment, multiple spans exist in the optical fiber link, and coherent or incoherent superposition is performed for nonlinear noise $P_{NL1}$, $P_{NL2}$, $P_{NL3}$, and $P_{NL4}$ of each span to obtain the total nonlinear noise $P_{NL}$ of the optical fiber link.

Similar to step S204 in Embodiment 1, if integral optical power in signal bandwidth at an incident place of each span is the same and is $P_S$, the nonlinear transmission impairment of the optical fiber link is calculated directly according to formula (4); and if the integral optical power in the signal bandwidth at the incident place of each span is different, superposition is performed for scaled noise of each span to obtain the total nonlinear noise $P_{NL}'$ of the optical fiber link, and equivalent incident power $P_S$ and the total nonlinear noise $P_{NL}'$ of the optical fiber link are substituted into formula (4) to calculate the nonlinear transmission impairment of the optical fiber link.

According to the method for calculating a nonlinear transmission impairment of an optical fiber link provided in this embodiment of the present invention, a nonlinear factor that is of an optical fiber link and does not pass through an optical filter is corrected, so as to obtain nonlinear noise that is of the optical fiber link and passes through an optical filter, thereby quickly and correctly calculating a nonlinear transmission impairment of the optical fiber link, saving system resources and calculation time, and reducing system costs, making it convenient to integrate a function of calculating a nonlinear transmission impairment into a device.

In practical application, the method for calculating a nonlinear transmission impairment of an optical fiber link provided in this embodiment of the present invention is applicable to both a system with an optical performance monitoring unit and a system without an optical performance monitoring unit.

Embodiment 4

Figure 4:
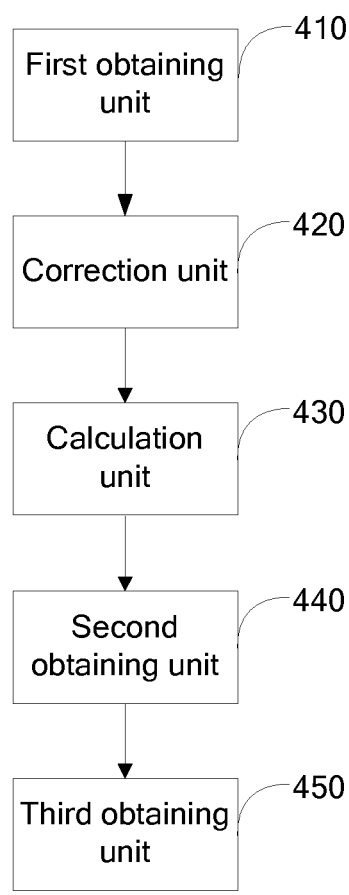
FIG. 4 is a structural block diagram of an apparatus for calculating a nonlinear transmission impairment of an optical fiber link according to an embodiment of the present invention.

This embodiment of the present invention provides an apparatus for calculating a nonlinear transmission impairment of an optical fiber link, as shown in FIG. 4, including:

a first obtaining unit 410, configured to determine that no pump channel exists in an optical fiber link, obtain a factor of intra-band nonlinear noise that is in the optical fiber link and does not pass through an optical filter, and obtain integral power in signal light bandwidth of a span in the optical fiber link;

a correction unit 420, configured to correct the factor of intra-band nonlinear noise that does not pass through an optical filter, to obtain a factor of intra-band nonlinear noise of the span in the optical fiber link that passes through an optical filter;

a calculation unit 430, configured to calculate nonlinear noise of the span in the optical fiber link by using the following formula:

$$P_{NL}=\alpha_{intra}(n)\cdot(P_S)^3;$$

where, $P_{NL}$ represents the nonlinear noise of the span;

$\alpha_{intra}(n)$ represents the factor of intra-band nonlinear noise of the span that passes through an optical filter;

n represents the number of optical filters through which a signal light of the span passes; and $P_S$ represents the integral power in the signal light bandwidth of the span;

a second obtaining unit 440, configured to obtain total nonlinear noise of the optical fiber link according to the nonlinear noise of the span in the optical fiber link; and a third obtaining unit 450, configured to obtain a nonlinear transmission impairment of the optical fiber link.

Further, if multiple spans exist in the optical fiber link, the second obtaining unit 440 may specifically include:

a second obtaining subunit 441, configured to perform superposition on nonlinear noise of the spans in the optical fiber link to obtain the total nonlinear noise of the optical fiber link.

Further, the correction unit 420 may specifically include: a correction subunit 421, configured to use the following formula to obtain the factor of intra-band nonlinear noise of the span in the optical fiber link that passes through an optical filter:

$$\alpha_{intra}(n) = \alpha_{intra}\cdot\left(\frac{P_{sp}^n}{P_{sp}^0}\right)^{k1};$$

where, $\alpha_{intra}(n)$ represents the factor of intra-band nonlinear noise of the span that passes through an optical filter;

$\alpha_{intra}$ represents the factor of intra-band nonlinear noise that does not pass through an optical filter;

$P_{sp}^0$ represents peak power of a signal light that is of the span and does not pass through an optical filter;

$P_{sp}^n$ represents peak power of a signal light of the span that passes through n optical filters;

k1 represents a correction constant of the factor of intra-band nonlinear noise when the signal light passes through an optical filter.

Further, k1 may be obtained by using the following formula:

$$k1 = \log_{\left(\frac{P_{sp}^r}{P_{sp}^0}\right)}\left(\frac{\alpha_{intra}(r)}{\alpha_{intra}}\right) = \frac{\log_{10}\left(\frac{\alpha_{intra}(r)}{\alpha_{intra}}\right)}{\log_{10}\left(\frac{P_{sp}^r}{P_{sp}^0}\right)};$$

where, $\alpha_{intra}(r)$ represents the factor of intra-band nonlinear noise of the span that passes through an optical filter when n=r.

$P_{ps}^r$ represents peak power of a signal light of the span that passes through r optical filters; and r is a positive integer.

Embodiment 5

This embodiment of the present invention provides an apparatus for calculating a nonlinear transmission impairment of an optical fiber link, as shown in FIG. 4, including:

a first obtaining unit 410, configured to determine that one or more pump channels exist in an optical fiber link, obtain a factor of intra-band nonlinear noise that is in the optical fiber link and does not pass through an optical filter and a factor of inter-band nonlinear noise that is in the optical fiber link and does not pass through an optical filter, and obtain integral power in signal light bandwidth of a span in the optical fiber link and integral power in pump channel bandwidth of the span in the optical fiber link;

a correction unit 420, configured to correct the factor of intra-band nonlinear noise that does not pass through an optical filter and the factor of inter-band nonlinear noise that does not pass through an optical filter, to obtain a factor of intra-band nonlinear noise of the span in the optical fiber link that passes through an optical filter and a factor of inter-band nonlinear noise of the span in the optical fiber link that passes through an optical filter;

a calculation unit 430, configured to calculate nonlinear noise of the span in the optical fiber link by using the following formula:

$$P_{NL}=\alpha_{intra}(n)\cdot(P_S)^3+\Sigma_{j=1}^{k}\alpha_{inter}(n,m)\cdot P_S\cdot(P_{Nj})^2;$$

where, $P_{NL}$ represents the nonlinear noise of the span;

$\alpha_{intra}(n)$ represents the factor of intra-band nonlinear noise of the span that passes through an optical filter;

$\alpha_{inter}(n)$ m represents the factor of inter-band nonlinear noise of the span that passes through an optical filter;

n represents the number of optical filters through which a signal light of the span passes, and m represents the number of optical filters through which a pump channel of the span passes;

$P_S$ represents the integral power in the signal light bandwidth of the span;

$P_{Nj}$ represents integral power in bandwidth of the $j^{th}$ pump channel of the span; and k represents the number of pump channels in the optical fiber link;

a second obtaining unit 440, configured to obtain total nonlinear noise of the optical fiber link according to the nonlinear noise of the span in the optical fiber link; and a third obtaining unit 450, configured to obtain a nonlinear transmission impairment of the optical fiber link.

Further, if multiple spans exist in the optical fiber link, the second obtaining unit 440 may specifically include:

a second obtaining subunit 441, configured to perform superposition on nonlinear noise of the spans in the optical fiber link to obtain the total nonlinear noise of the optical fiber link.

Further, the correction unit 420 may specifically include: a correction subunit 421, configured to use the following formula to obtain the factor of intra-band nonlinear noise of the span in the optical fiber link that passes through an optical filter:

$$\alpha_{intra}(n) = \alpha_{intra}\cdot\left(\frac{P_{sp}^n}{P_{sp}^0}\right)^{k1};$$

and
configured to use the following formula to obtain the factor of inter-band nonlinear noise of the span in the optical fiber link that passes through an optical filter:

$$\alpha_{inter}(n, m) = \alpha_{inter} \cdot \left(\frac{P_{sp}^n}{P_{sp}^0}\right)^{k2} \cdot \left(\frac{P_{pp}^m}{P_{pp}^0}\right)^{k3};$$

where, $\alpha_{intra}(n)$ represents the factor of intra-band nonlinear noise of the span that passes through an optical filter;

$\alpha_{inter}(n,m)$ represents the factor of inter-band nonlinear noise of the span that passes through an optical filter;

$\alpha_{intra}$ represents the factor of intra-band nonlinear noise that does not pass through an optical filter;

$\alpha_{inter}$ represents the factor of inter-band nonlinear noise that does not pass through an optical filter;

$P_{sp}^0$ represents peak power of a signal light that is of the span and does not pass through an optical filter;

$P_{sp}^n$ represents peak power of a signal light of the span that passes through n optical filters;

$P_{pp}^0$ represents peak power of a pump channel that is of the span and does not pass through an optical filter;

$P_{pp}^m$ represents peak power of a pump channel of the span that passes through m optical filters;

k1 represents a correction constant of the factor of intra-band nonlinear noise when the signal light passes through an optical filter;

k2 represents a correction constant of the factor of inter-band nonlinear noise when the signal light passes through an optical filter; and k3 represents a correction constant of the factor of inter-band nonlinear noise when the pump channel passes through an optical filter.

Further, k1 may be obtained by using the following formula:

$$k1 = \log_{\left(\frac{P_{sp}^r}{P_{sp}^0}\right)}\left(\frac{\alpha_{intra}(r)}{\alpha_{intra}}\right) = \frac{\log_{10}\left(\frac{\alpha_{intra}(r)}{\alpha_{intra}}\right)}{\log_{10}\left(\frac{P_{sp}^r}{P_{sp}^0}\right)};$$

k2 is obtained by using the following formula:

$$k2 = \log_{\left(\frac{P_{sp}^r}{P_{sp}^0}\right)}\left(\frac{\alpha_{inter}(r, 0)}{\alpha_{inter}}\right) = \frac{\log_{10}\left(\frac{\alpha_{inter}(r, 0)}{\alpha_{inter}}\right)}{\log_{10}\left(\frac{P_{sp}^r}{P_{sp}^0}\right)};$$

and k3 is obtained by using the following formula:

$$k3 = \log_{\left(\frac{P_{pp}^s}{P_{pp}^0}\right)}\left(\frac{\alpha_{inter}(0, s)}{\alpha_{inter}}\right) = \frac{\log_{10}\left(\frac{\alpha_{inter}(0, s)}{\alpha_{inter}}\right)}{\log_{10}\left(\frac{P_{pp}^s}{P_{pp}^0}\right)};$$

where, $\alpha_{intra}(r)$ represents the factor of intra-band nonlinear noise of the span that passes through an optical filter when n=r;

$\alpha_{inter}(r,0)$ represents the factor of inter-band nonlinear noise of the span that passes through an optical filter when n=r, m=0;

$\alpha_{inter}(0,s)$ represents the factor of inter-band nonlinear noise of the span that passes through an optical filter when n=0, m=s;

$P_{sp}^r$ represents peak power of a signal light of the span that passes through r optical filters;

$P_{pp}^s$ represents peak power of a pump channel of the span that passes through s optical filters; and r and s are positive integers.

Because content, such as information exchange and a performing process between each module in the apparatuses in Embodiments 4 and 5, and the method embodiments of the present invention are base on a same conception, for detailed content, reference may be made to the descriptions in the method embodiments of the present invention, and no further details are provided herein.

According to the apparatus for calculating a nonlinear transmission impairment of an optical fiber link provided in this embodiment of the present invention, a nonlinear factor that is of an optical fiber link and does not pass through an optical filter is corrected, so as to obtain nonlinear noise that is of the optical fiber link and passes through an optical filter, thereby quickly and correctly calculating a nonlinear transmission impairment of the optical fiber link, saving system resources and calculation time, and reducing system costs, making it convenient to integrate a function of calculating a nonlinear transmission impairment into a device.

A person of ordinary skill in the art may understand that all or a part of the steps of the method embodiments may be implemented by a computer program instructing relevant hardware. The program may be stored in a computer readable storage medium. When the program runs, the processes of the method embodiments are performed. The storage medium may include: a magnetic disk, an optical disc, a read-only memory (Read-Only Memory, ROM), or a random access memory (Random Access Memory, RAM).

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method comprising:
determining that no pump channel exists in an optical fiber link, obtaining a factor of intra-band nonlinear noise that is in the optical fiber link and does not pass through an optical filter, and obtaining integral power in signal light bandwidth of a span in the optical fiber link;
correcting the factor of intra-band nonlinear noise that does not pass through the optical filter, to obtain a factor of intra-band nonlinear noise of the span in the optical fiber link that passes through the optical filter;
calculating nonlinear noise of the span in the optical fiber link by using the following formula:

$$P_{NL} = \alpha_{intra}(n) \cdot (P_S)^3;$$

wherein, $P_{NL}$ represents the nonlinear noise of the span;

$\alpha_{intra}(n)$ represents the factor of intra-band nonlinear noise of the span that passes through the optical filter;

n represents the number of optical filters through which a signal light of the span passes; and $P_S$ represents the integral power in the signal light bandwidth of the span;

obtaining total nonlinear noise of the optical fiber link according to the nonlinear noise of the span in the optical fiber link, and obtaining a nonlinear transmission impairment of the optical fiber link; and arranging the optical filter in the optical fiber link based on the nonlinear transmission impairment of the optical fiber link.

2. The method according to claim 1, wherein if multiple spans exist in the optical fiber link, the obtaining total nonlinear noise of the optical fiber link according to the nonlinear noise of the span in the optical fiber link comprises:

performing superposition on nonlinear noise of the spans in the optical fiber link to obtain the total nonlinear noise of the optical fiber link.

3. The method according to claim 1, wherein the correcting the factor of intra-band nonlinear noise that does not pass through the optical filter, to obtain a factor of intra-band nonlinear noise of the span in the optical fiber link that passes through the optical filter comprises:

obtaining, by using the following formula, the factor of intra-band nonlinear noise of the span in the optical fiber link that passes through the optical filter:

$$\alpha_{intra}(n) = \alpha_{intra} \cdot \left(\frac{P_{sp}^n}{P_{sp}^0}\right)^{k1};$$

wherein, $\alpha_{intra}(n)$ represents the factor of intra-band nonlinear noise of the span that passes through an optical filter;

$\alpha_{intra}$ represents the factor of intra-band nonlinear noise that does not pass through the optical filter;

$P_{sp}^0$ represents peak power of a signal light that is of the span and does not pass through the optical filter;

$P_{sp}^n$ represents peak power of a signal light of the span that passes through n optical filters; and k1 represents a correction constant of the factor of intra-band nonlinear noise when the signal light passes through the optical filter.

4. The method according to claim 3, wherein k1 is obtained by using the following formula:

$$k1 = \log_{\left(\frac{P_{sp}^r}{P_{sp}^0}\right)}\left(\frac{\alpha_{intra}(r)}{\alpha_{intra}}\right) = \frac{\log_{10}\left(\frac{\alpha_{intra}(r)}{\alpha_{intra}}\right)}{\log_{10}\left(\frac{P_{sp}^r}{P_{sp}^0}\right)};$$

wherein, $\alpha_{intra}(r)$ represents the factor of intra-band nonlinear noise of the span that passes through the optical filter when n=r;

$P_{sp}^r$ represents peak power of a signal light of the span that passes through r optical filters; and r is a positive integer.

5. A method comprising:

determining that one or more pump channels exist in an optical fiber link, obtaining a factor of intra-band nonlinear noise that is in the optical fiber link and does not pass through an optical filter and a factor of inter-band nonlinear noise that is in the optical fiber link and does not pass through the optical filter, and obtaining integral power in signal light bandwidth of a span in the optical fiber link and integral power in pump channel bandwidth of the span in the optical fiber link;

correcting the factor of intra-band nonlinear noise that does not pass through the optical filter and the factor of inter-band nonlinear noise that does not pass through the optical filter, to obtain a factor of intra-band nonlinear noise of the span in the optical fiber link that passes through the optical filter and a factor of inter-band nonlinear noise of the span in the optical fiber link that passes through the optical filter;

calculating nonlinear noise of the span in the optical fiber link by using the following formula:

$$P_{NL} = \alpha_{intra}(n) \cdot (P_S)^3 + \Sigma_{j=1}^{k}(n,m) \cdot P_S \cdot (P_{Nj})^2;$$

wherein, $P_{NL}$ represents the nonlinear noise of the span;

$\alpha_{intra}(n)$ represents the factor of intra-band nonlinear noise of the span that passes through the optical filter;

$\alpha_{inter}(n,m)$ represents the factor of inter-band nonlinear noise of the span that passes through the optical filter;

n represents the number of optical filters through which a signal light of the span passes, and m represents the number of optical filters through which a pump channel of the span passes;

$P_S$ represents the integral power in the signal light bandwidth of the span;

$P_{Nj}$ represents integral power in bandwidth of the $j^{th}$ pump channel of the span; and k represents the number of pump channels in the optical fiber link;

obtaining total nonlinear noise of the optical fiber link according to the nonlinear noise of the span in the optical fiber link, and obtaining a nonlinear transmission impairment of the optical fiber link; and arranging the optical filter in the optical fiber link based on the nonlinear transmission impairment of the optical fiber link.

6. The method according to claim 5, wherein if multiple spans exist in the optical fiber link, the obtained total nonlinear noise of the optical fiber link according to the nonlinear noise of the span in the optical fiber link comprises:

performing superposition on nonlinear noise of the spans in the optical fiber link to obtain the total nonlinear noise of the optical fiber link.

7. The method according to claim 5, wherein the correcting the factor of intra-band nonlinear noise that does not pass through the optical filter and the factor of inter-band nonlinear noise that does not pass through the optical filter, to obtain a factor of intra-band nonlinear noise of the span in the optical fiber link that passes through the optical filter and a factor of inter-band nonlinear noise of the span in the optical fiber link that passes through the optical filter comprises:

obtaining, by using the following formula, the factor of intra-band nonlinear noise of the span in the optical fiber link that passes through the optical filter:

$$\alpha_{intra}(n) = \alpha_{intra} \cdot \left(\frac{P_{sp}^n}{P_{sp}^0}\right)^{k1};$$

obtaining, by using the following formula, the factor of inter-band nonlinear noise of the span in the optical fiber link that passes through the optical filter:

$$\alpha_{inter}(n, m) = \alpha_{inter} \cdot \left(\frac{P_{sp}^n}{P_{sp}^0}\right)^{k2} \cdot \left(\frac{P_{pp}^m}{P_{pp}^0}\right)^{k3};$$

wherein,
$\alpha_{intra}(n)$ represents the factor of intra-band nonlinear noise of the span that passes through the optical filter;
$\alpha_{inter}(n,m)$ represents the factor of inter-band nonlinear noise of the span that passes through the optical filter;
$\alpha_{intra}$ represents the factor of intra-band nonlinear noise that does not pass through the optical filter;
$\alpha_{inter}$ represents the factor of inter-band nonlinear noise that does not pass through the optical filter;
$P_{sp}^0$ represents peak power of a signal light that is of the span and does not pass through the optical filter;
$P_{sp}^n$ represents peak power of a signal light of the span that passes through n optical filters;
$P_{pp}^0$ represents peak power of a pump channel that is of the span and does not pass through the optical filter;
$P_{pp}^m$ represents peak power of a pump channel of the span that passes through m optical filters;
k1 represents a correction constant of the factor of intra-band nonlinear noise when the signal light passes through the optical filter;
k2 represents a correction constant of the factor of inter-band nonlinear noise when the signal light passes through the optical filter; and
k3 represents a correction constant of the factor of inter-band nonlinear noise when the pump channel passes through the optical filter.

8. The method according to claim 7, wherein k1 is obtained by using the following formula:

$$k1 = \log_{\left(\frac{P_{sp}^r}{P_{sp}^0}\right)}\left(\frac{\alpha_{intra}(r)}{\alpha_{intra}}\right) = \frac{\log_{10}\left(\frac{\alpha_{intra}(r)}{\alpha_{intra}}\right)}{\log_{10}\left(\frac{P_{sp}^r}{P_{sp}^0}\right)};$$

k2 is obtained by using the following formula:

$$k2 = \log_{\left(\frac{P_{sp}^r}{P_{sp}^0}\right)}\left(\frac{\alpha_{inter}(r, 0)}{\alpha_{inter}}\right) = \frac{\log_{10}\left(\frac{\alpha_{inter}(r, 0)}{\alpha_{inter}}\right)}{\log_{10}\left(\frac{P_{sp}^r}{P_{sp}^0}\right)};$$

k3 is obtained by using the following formula:

$$k3 = \log_{\left(\frac{P_{pp}^s}{P_{pp}^0}\right)}\left(\frac{\alpha_{inter}(0, s)}{\alpha_{inter}}\right) = \frac{\log_{10}\left(\frac{\alpha_{inter}(0, s)}{\alpha_{inter}}\right)}{\log_{10}\left(\frac{P_{pp}^s}{P_{pp}^0}\right)};$$

wherein,
$\alpha_{intra}(r)$ represents a factor of intra-band nonlinear noise of the span that passes through the optical filter when n=r;

$\alpha_{inter}(r,0)$ represents a factor of inter-band nonlinear noise of the span that passes through the optical filter when n=r, m=0;
$\alpha_{inter}(0,s)$ represents a factor of inter-band nonlinear noise of the span that passes through the optical filter when n=0, m=s;
$P_{sp}^r$ represents peak power of a signal light of the span that passes through r optical filters;
$P_{pp}^s$ represents peak power of a pump channel of the span that passes through s optical filters; and
r and s are positive integers.

9. An apparatus for calculating a nonlinear transmission impairment of an optical fiber link, comprising:
a processor and a non-transitory computer readable medium having a plurality of computer executable instructions stored thereon which, when executed by the processor, cause the processor to:
determine that no pump channel exists in an optical fiber link, obtain a factor of intra-band nonlinear noise that is in the optical fiber link and does not pass through an optical filter, and obtain integral power in signal light bandwidth of a span in the optical fiber link;
correct the factor of intra-band nonlinear noise that does not pass through the optical filter, to obtain a factor of intra-band nonlinear noise of the span in the optical fiber link that passes through the optical filter;
calculate nonlinear noise of the span in the optical fiber link by using the following formula:

$$P_{NL} = \alpha_{intra}(n) \cdot (P_S)^3;$$

wherein,
$P_{NL}$ represents the nonlinear noise of the span;
$\alpha_{intra}(n)$ represents the factor of intra-band nonlinear noise of the span that passes through the optical filter;
n represents the number of optical filters through which a signal light of the span passes; and
$P_S$ represents the integral power in the signal light bandwidth of the span;
obtain total nonlinear noise of the optical fiber link according to the nonlinear noise of the span in the optical fiber link;
obtain a nonlinear transmission impairment of the optical fiber link; and
determine where to arrange the optical filter in the optical fiber link based on the nonlinear transmission impairment of the optical fiber link.

10. The apparatus according to claim 9, wherein if multiple spans exist in the optical fiber link, the processor is further caused to perform superposition on nonlinear noise of the spans in the optical fiber link to obtain the total nonlinear noise of the optical fiber link.

11. The apparatus according to claim 9, wherein the processor is further caused to use the following formula to obtain the factor of intra-band nonlinear noise of the span in the optical fiber link that passes through the optical filter:

$$\alpha_{intra}(n) = \alpha_{intra} \cdot \left(\frac{P_{sp}^n}{P_{sp}^0}\right)^{k1};$$

wherein,
$\alpha_{intra}(n)$ represents the factor of intra-band nonlinear noise of the span that passes through the optical filter;
$\alpha_{intra}$ represents the factor of intra-band nonlinear noise that does not pass through the optical filter;

$P_{sp}^{0}$ represents peak power of a signal light that is of the span and does not pass through the optical filter;

$P_{sp}^{n}$ represents peak power of a signal light of the span that passes through n optical filters; and k1 represents a correction constant of the factor of intra-band nonlinear noise when the signal light passes through the optical filter.

12. The apparatus according to claim 11, wherein k1 is obtained by using the following formula:

$$k1 = \log_{\left(\frac{P_{sp}^{r}}{P_{sp}^{0}}\right)}\left(\frac{\alpha_{intra}(r)}{\alpha_{intra}}\right) = \frac{\log_{10}\left(\frac{\alpha_{intra}(r)}{\alpha_{intra}}\right)}{\log_{10}\left(\frac{P_{sp}^{r}}{P_{sp}^{0}}\right)};$$

wherein, $\alpha_{intra}(r)$ represents a factor of intra-band nonlinear noise of the span that passes through the optical filter when n=r;

$P_{sp}^{r}$ represents peak power of a signal light of the span that passes through r optical filters; and r is a positive integer.

* * * * *

UNITED STATES PATENT AND TRADEMARK OFFICE
CERTIFICATE OF CORRECTION

Page 1 of 1

PATENT NO. : 9,525,481 B2
APPLICATION NO. : 14/580989
DATED : December 20, 2016
INVENTOR(S) : Sen Zhang et al.

It is certified that error appears in the above-identified patent and that said Letters Patent is hereby corrected as shown below:

In the Claims

Column 27, Line 4, Claim 1:
After "span;" insert --and--, therefor.

Signed and Sealed this
Twenty-third Day of May, 2017

Michelle K. Lee
*Director of the United States Patent and Trademark Office*